United States Patent Office 3,234,313
Patented Feb. 8, 1966

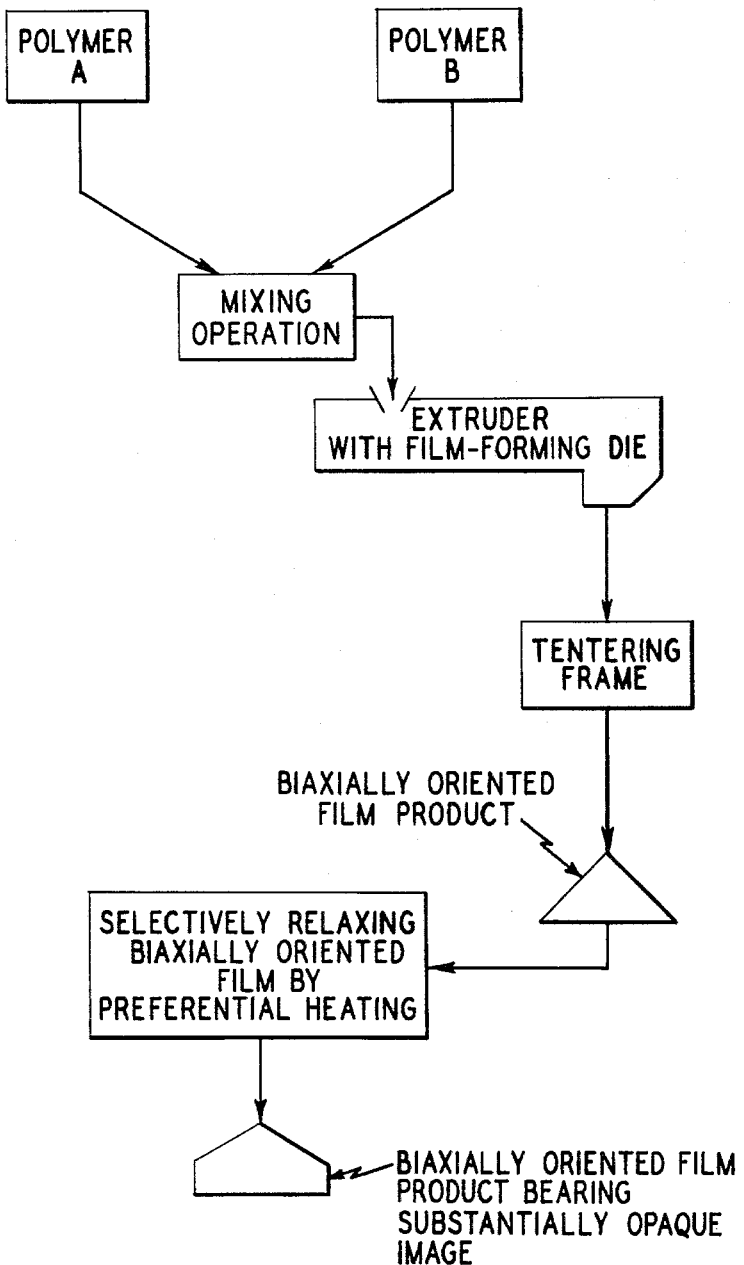

3,234,313
THERMOPLASTIC FILMS AND PROCESS
FOR PREPARING SAME
Walter A. Miller, Somerville, and Stephen O. Cook,
Lebanon, N.J., assignors to Union Carbide Corporation,
a corporation of New York
Filed July 3, 1961, Ser. No. 121,363
14 Claims. (Cl. 264—230)

The present invention relates in general to thermoplastic films and sheets, and more particularly to transparent films and sheets formed from two or more incompatible synthetic thermoplastic film forming resin materials.

It is well know in the art to prepare films and sheets of any one of a wide variety of synthetic organic polymers and to improve the strength properties thereof by subjecting them to either a monoaxial or a biaxial cold stretching operation, thereby inducing molecular orientation in the film. Heretofore this stretching operation has been confined to films formed from either a single resin component or from a mixture of two or more resins which are compatible, i.e. mutually soluble in one another, in the temperature range over which the stretching operation is carried out.

It is also well known to admix finely ground particles of two or more incompatible resins which have substantially different second order transition temperatures, melt extrude the mixture as fibers, and thereafter molecularly orient the fibers in the longitudinal, i.e., machine direction to obtain a composite monofilament. These monofilaments are composed of individual fibers of each of the resins employed in a substantially parallel configuration in the longitudinal direction, and can be separated from each other by mechanically flexing or beating the composite monofilament. Because of the light-scattering configuration of these individual fibers, the composite monofilaments formed therefrom are for the most part opaque, or at best translucent, and cannot therefore be utilized in applications requiring transparency to visible light rays.

It is also known to form articles of two incompatible fiber forming resins by compression or injection molding a mixture of the resins in the molten state to achieve an article having a pearl-like character, being iridescent and varying in color throughout. Besides lacking transparency, the articles are quite brittle in nature and cannot withstand even moderate flexing.

We have now discovered, however, a method for preparing sheets and films from two or more incompatible synthetic organic resins which are tough and highly flexible and which are transparent to incident light. In general, the method of this invention comprises intimately admixing two or more normally solid mutually incompatible synthetic organic polymers which are orientable at a common temperature, forming a film from the mixture thus obtained and thereafter biaxially orienting the film in the direction of its two major axes while each of the polymer constituents is in the amorphous rubbery state above their second order transition temperature, to a degree whereby the shrinkage value of the polymer mass comprising the composite film is at least about 5 percent, and preferably about 10 percent in the direction of each major axis of the film.

The steps of the method of the present invention are schematically illustrated by the single figure in the accompanying drawing wherein there is shown two mutually incompatible synthetic organic polymers, designated as polymer A and polymer B, being fed to a mixing station wherein they are intimately admixed and extruded into film, such as by means of a conventional extruder equipped with a film forming die. The extruded film is then oriented by conventional means such as on a tentering frame as shown or by other suitable orientation means to obtain the transparent film product of the present invention. Portions of the transparent oriented film thereby obtained can then be selectively relaxed by being subjected to preferential heating to obtain film transparency having opaque images which are suitable for many obvious uses of the film including projection on a viewing screen if desired.

The normally solid synthetic organic polymers which can be used in combination in the practice of this invention are those which are each normally in an amorphous, rubbery state at temperatures which are above their second order transition temperature (the so-called glass transition temperature), are incompatible with one another, and are orientable at some common temperature or through some common temperature range. The terms "second order transition temperature ($T_g$)," "amorphous" and "rubbery state" as used herein and in the claims are intended to mean and connote the phenomena and conditions normally applied by the art to these terms, as for example as set forth in (Properties and Structure of Polymers, Tobolsky, John Wiley & Sons, New York, 1960, pages 61–81). At the second order transition point, which is a fairly sharply defined temperature, amorphous polymers undergo a change in condition from relatively hard glass-like solids to soft flexible and rubber-like materials. This change in condition suggests an association of the second order transition temperature with molecular mobility, which is generally held to be the case. With amorphous fiber and film forming resins, $T_g$ bears an important relationship to the drawing process—drawing being much easier above $T_g$ than below it, and as a rule is practical only above $T_g$.

The limitation that the useful polymers be amorphous above $T_g$ stems from the necessity for biaxially orienting the composite films to attain the benefits afforded by the instant invention. As with most terms signifying concepts in the polymer art, "amorphous" does not define an absolute condition, but when associated with the stretch-orientation requirements of the present process, will nevertheless define the class of suitable polymers unambiguously to those skilled in the art. Amorphous polymers as used hereinafter include not only those polymers which exhibt true amorphousness in the classical sense such as atactic polystyrene but also those which, while having some crystalline nature, neverthless are susceptible to stretch induced molecular orientation or can be brought into an amorhpous-like condition at the temperature and for the duration of the stretching step of the process of this invention.

This latter consideration is exemplified by gutta percha which has the second order transition temperature at about —53° C. In admixture with polystyrene, there is no common temperature at which biaxial orientation can be carried out. By moderate cross-linking, however, the rubbery state of gutta percha can be extended to the region of 120°–160° C., thereby providing a coincidence or overlap of the amorphous rubbery state of the two polymers above their respective second order transition temperatures.

Exemplary but not limitative of the polymers useful in this invention are polystyrene, poly($\alpha$-methylstyrene), poly(vinyl chloride), poly(methylmethacrylate), polyacrylonitrile, poly(vinyl acetate), poly(hydroxyethers), polyoxymethylene, polybutadiene, cis polyisoprene, polydimethylbutadiene, polyvinylformal, polyvinyl acetal, vinyl chloride, acrylonitrile copolymers, polyvinylidene chloride, polyethylmethacrylate, poly-n-propylmethacrylate, polycarbonates such as those prepared by reaction of a bisphenol with phosgene, poly-$\alpha$-vinylnaphthalene, poly-$\alpha$- vinylpyridine, polymethylacrylate, vinylidene chloride, vinyl acetate copolymers, polyvinylbutyral, polydichlorostyrene, and the like.

To prepare the composite sheets and films of this invention two or more mutually incompatible resin materials, which also meet the rubbery-state temperature conditions described above, are intimately admixed according to any of the well known general techniques. This can readily be accomplished by heating accompanied by agitation, dissolving in a mutual solvent and evaporating the solvent or passing the solution into a nonsolvent precipitating bath, by mixing on heated differential rolls, or by even dry mixing finely ground particles of the individual resins employed. Any one of the resin species can be present in an amount of from 5% to 95% by weight with the remaining portion being composed entirely of a single incompatible resin, or proportioned in any way between the two or more other incompatible resins in those cases where a total of three or more different resins are employed. Preferably not more than three resins are used, and most preferably a mixture of only two incompatible resins is employed. In the most preferred embodiment using only two resins, it is further preferred that one of the resins be present in an amount of from about 5% to about 50%.

Formation of the unoriented composite sheets of films can be accomplished by conventional extrusion methods using a T-slot film forming die, or by using an annular die to produce a tubular extrudate which is subsequently slit to yield flat film. Simple compression molding methods are entirely adequate where articles of relatively small dimensions are required. The extrusion or molding temperature can readily be determined by one skilled in the art. In general temperatures in the range of about 110° to 270° C. are satisfactory for most resin mixtures.

The sheets produced directly by simple molding or extrusion opertaions vary in physical characteristics depending on the temperature used for each composite system. The sheets are in all cases composed of two or more distinct polymer phases, i.e., the article remains a heterogeneous mixture, but the shape and spatial arrangement of the discrete polymer masses may vary from approximately spherical to leaflet-like, with the individual leaflets varying in thickness, size, shape and angularity. The nature of these intermediate forms is not an important consideration, however, since all lend themselves readily to the critical biaxial stretching step of the overall process and yield the novel sheets and films described hereinafter in detail.

It is to be noted, however, that except in the case where the index of refraction of the incompatible polymers are identical, the intermediate forms are opaque regardless of the optical clarity of the individual polymers. All of the intermediate forms are brittle and of quite low strength regardless of the toughness of the individual members of composite resin system. The opacity is presumably due to the light scattering properties of the irregular surfaces of the spheres or leaflets making up the sheet. The low strength characteristics apparently stem from the relatively small area of contact between the individual resin phases and the low affinity of the surface of one phase for that of the other surfaces.

In view of the poor physical properties of the intermediate composite sheets which rendered them useful only for decorative purposes where strength is not an important consideration and the opacity is essential, it was most surprising to find that co-biaxial stretching of such a sheet at a temperature at which all of the individual resin components are in a rubbery state imparted a high degree of toughness and clarity to the composite sheets.

The degree of stretch in each of the two major axes of the film need not be the same, but it is a critical factor that sufficient biaxial stretch be applied to impart a shrinkage value of at least about 5 percent and preferably at least 10 percent linear shrinkage along each of the two major axes of the film, at a temperature 50° C. above the $T_g$ of the major constituent. Maximum, i.e. ultimate, shrinkage in each direction is at least 20 percent, and preferably at least 50 percent in each direction. A degree of draw or stretching in each major direction of at least 50% and preferably 200% is required to impart the necessary shrinkage values. Although shrinkage is a phenomenon normally associated with molecular orientation, it is to be understood that the sheets and films of the present invention need not posses molecular biaxial orientation. Flexibility and clarity adequate to establish the present composite films as a new article of manufacture distinct from prior known composite articles are secured by causing the individual particles of the original mixture to assume a lamellate configuration in which the irregular particles have been converted to very thin individual leaflets of large surface area, all of which lie in substantially parallel planes and intimately contact each other through their major planar surfaces. While we do not wish to be bound by any particular theory, it appears that the intersurface forces and substantially parallel configuration provide considerable strength to the composite films which is independent of strength properties normally associated with molecular orientation.

The above considerations notwithstanding, formation of the lamellate structure in which the individual platelets have sufficient surface area to provide adequate strength, is accomplished advantageously by co-biaxial stretching at a temperature at which molecular orientation is induced in the lamellae to a substantial degree. Thus, the final product films derive strength from two different phenomena and are made more desirable thereby.

Any of the methods well known in the art for biaxially orienting single component plastic films can be suitably employed in the practice of the present invention. Typical of these techniques and apparatus for carrying out same are those set forth in detail in U.S.P. 2,452,080, W. T. Stephenson, U.S.P. 2,618,012, D. T. Milne, U.S.P. 2,571,355, C. E. Carpenter, U.S.P. 2,412,187, F. E. Wiley et al. and U.S.P. 2,074,285, E. Studt et al. Included in the above disclosures are the general methods known as tentering and bubble stretching. It is to be understood that although specific temperature ranges, degrees of stretching, and polymers are concerned in some instances, the general methods disclosed therein are readily adaptable to the process of the present invention provided the critical considerations described hereinbefore are taken into account.

The biaxially oriented sheets and films produced in accordance with the present process are, as a class, transparent when film thickness does not exceed about 20 mils. Most are completely clear water-white films at thicknesses up to about 15 mils. In a few instances, notably where the composite films are formed from mixtures of polystyrene with polymethylmethacrylate; polyhydroxyethers with polystyrene; and polyhydroxyether with styrene-acrylonitrile; the biaxially stretch oriented films possess some haze, but are nevertheless sufficiently transparent to permit 7 point printers type to be easily legible when a 2 mil sample of the film is superimposed on a printed page containing this size print.

The strength properties of the composite films of this invention have quite surprisingly been found to lie intermediate those of films formed from the individual component resins alone. Such properties as tensile strength and elongation can be altered at will, within the limits of the individual components, by varying the proportionality of the incompatible resins in the composition. Thus, in a polystyrene-polyhydroxyether film, the strength properties can be "tailored" to approximate those of polystyrene by increasing the relative amount of this resin in the original mixture. In similar fashion, increasing the polyhydroxyether content tends to alter the strength properties of the composite film in the direction of a one component polyhydroxyether film.

The essentially transparent optical properties are also unexpected. Apparently it is immaterial whether the optical properties of the individual resin components are the same or quite different, provided of course, each resin component is itself transparent. The parallel lamellate internal structure of the films permits light passage with the occurrence of only nominal light scattering. By virtue of this transparency, the biaxially oriented sheets and films of this invention possess a novel utility absent in prior known composite films.

It has been found that any selected portion of a substantially transparent biaxially oriented composite film of this invention can be rendered opaque either by the use of heat or by the application of a solvent-plasticizer material for one or all of the incompatible resin components. Localized relaxation of the molecular orientation in the individual platelets making up the composite films results in a loss of transparency due to shrinkage of the local areas treated accompanied by disruption of the substantially parallel planar configuration of the lamellae. These areas thus become light scattering areas which are opaque and easily differentiated from the remaining untreated portion of the film.

In its simplest aspect, in order to reproduce an image on a sheet of biaxially oriented composite film, a patterned thermal shield is placed over the film and the exposed areas of the film selectively heated. The temperature to which the exposed areas are raised is not a narrowly critical factor but must be sufficient to permit a substantial relaxation of the molecular orientation of at least one, and preferably all, of the resin components. The precise temperature will depend, therefore, upon the particular resin system involved, the temperature at which the biaxial stretching of the initial film sample was carried out, and the degree of molecular orientation, i.e., shrinkage, of the untreated film. For most resin systems, a temperature of from about 100° C. to about 200° C. has been found to be adequate.

Numerous other techniques for selectively relaxing the molecular orientation in the films of the present invention will suggest themselves to those skilled in the art. For example, the image desired to be reproduced on the film can be made initially on a heat reflective surface with a heat absorptive material such as printers ink. To transfer the image to the film, the film is superimposed on the original drawing and the whole surface area of the film carefully heated using, for instance, an infra-red light bulb. The heat absorptive material on the original thereupon selectively heats that portion of the film surface directly in contact therewith, causing molecular relaxation and consequent opacity of the film in the desired areas.

In yet another aspect, image reproduction on the composite biaxially oriented film of this invention can be accomplished by contacting selected local areas thereof with a plasticizer for one or preferably all of the resins making up the composite film. The term "plasticizer" is not employed in any strict sense, but is intended to mean any chemical compound or composition which when brought into contact with a biaxially oriented film, preferably at room temperature, will induce sufficient freedom of molecular rotation within the film to permit the oriented polymer molecules to relax into an unoriented state. Such "plasticizers" therefore include true solvents for the resin components, the usual distinction between plasticizers and solvents based on volatility considerations being immaterial in the present situation. No distinction between plasticizers and softeners is made in accordance with generally accepted usage.

The choice of plasticizer or solvent will depend in large measure upon the particular resin system employed. Even though not all readily available plasticizers will effectively reduce the second order transition temperature of all the resins which can be used to form the composite film, it is, however, a matter of mere routine to those skilled in the art to select the proper plasticizer for any given resin system. Illustrative of plasticizers which are generally suitable for use with a vast number different resin systems are acetone, methanol, ethanol, isopropanol, amyl acetate, castor oil, tricresylphosphate, dibutylphthalate, dioctyl phthalate, methylene chloride, chloroform, trichloroethane, nitromethane, dioxane, pyridine, phenol, bisphenol, diphenylphosphate triphenylphosphate, benzene, toluene, xylene, butyl alcohol, chlorobenzene, dichloroethane, diethylamine, ethyl acetate, ethyl acetoacetate, ethylamine, benzylalcohol, chlorobenzene, cyclohexane, ethylbenzene, ethylether, glycerol, ethylene glycol, n-hexane, methylethylketone. The effectiveness of most plasticizers on most all conventional resins is set forth in The Technology of Solvents and Plasticizers, Doolittle, John Wiley & Sons, New York (1954).

The plasticizer can conveniently be applied to the surface of the biaxially oriented composite film with a pen or small brush, applied as one would apply printers ink to paper, or sprayed thereupon using a template to shield the portions of the surface which it is desirous to remain transparent.

Whether the casual means creating local opacity is thermal or chemical in nature, the resulting product is essentially the same to outward appearance. In most instances the image produced in and on the composite film is easily legible with the unaided eye. A more important use, perhaps, for these graphic films is as transparencies from which the image can be projected and enlarged onto a viewing surface in the same manner that "slides" are projected by a "lantern slide" device. The opaque portions of the film, because of their poor light transmission appear on the viewing surface as substantially dark portions which exist in enhanced contrast with the transparent portions which transmit the ray of the light source practically uninhibited. Thus, there is provided an economical and convenient method for preparing lecture slides and the like.

The sheets and films produced directly by the cobiaxial stretching operation of the process of this invention find wide utility in more conventional applications such as packaging material, as coating material paper, shipping drum liner, and the like.

The following examples are presented in order that the invention can be more clearly understood. These examples are intended in no way to be limitative of the invention except to the extent such limitations appear in the appended claims.

EXAMPLE 1

(A) Equal parts by weight of pellets of normally solid atactic polystyrene ($T_g=82°$ C.) and poly(methylmethacrylate) ($T_g=100°$ C.) were tumble mixed (in a conical blender) and then fed to a conventional screw type extruder equipped with an annular die for forming tubular film. Extrusion was carried out at 150° C. and the tubular extrudate co-biaxially oriented at a temperature of about 150° C. using the air inflation technique to induce molecular orientation in the traverse direction. Orientation in the machine direction was accomplished by drawing the extrudate away from the die orifice faster than the linear extrustion rate. Orientation induced was essentially equal in the machine and transverse directions and was to a degree sufficient to correspond to a shrinkage value at 130° C. of about 65% (ASTM D–1204–54). The biaxially oriented tube was thereafter slit longitudinally to yield a transparent flat film having a substantially uniform thickness of 1 mil.

(B) For purposes of comparison, sample films of pure polystyrene and pure poly(methylmethacrylate) were prepared in the identical manner as the above composite film. Physical properties of the film samples are set forth in Table I below.

Table I

|  | 100% Polystyrene Oriented Film | 50%–50% Oriented Mixture | 100% Oriented Polymethylmethacrylate |
|---|---|---|---|
| Thickness, mils | 1.0 | 1.0 | 1.0 |
| Tensile Strength, p.s.i., both directions ASTM D 882–56T | 9–10,000 | 8–9,000 | 8–9,000 |
| Percent Elongation, both directions ASTM D 882–56T | 10–20 | 10–20 | 3 |
| Percent Haze, ASTM D 1003–52 | 1 | 2 | 1 |
| Percent Shrinkage at 130° C., both directions ASTM D 1204–54 | 65 | 65 | 65 |

A 1 mil thick film was prepared (from the same mixture as used to form the composite film above) by compression molding between steel platens at 200° C. The film was unoriented and opaque. It was found that the film was too brittle to measure.

EXAMPLE 2

Two mixtures of different weight proportions of normally solid polystyrene ($T_g=82°$ C.) with a normally solid polyhydroxyether ($T_g=90°$ C.) formed from 2,2-(4,4'-dihydroxydiphenyl)propane and epichlorohydrin (according to the method of Carpenter et al., U.S.P. 2,602,075, issued July 1, 1952) were prepared, extruded, and biaxially oriented using the same conditions as in Example 1. The physical properties of the composite films thus formed are compared with each other and with films of pure polystyrene and pure polyhydroxyether in Table II below.

Table II

|  | 100% Polystyrene | 75% Polystyrene, 25% polyhydroxyether | 50% Polystyrene, 50% polyhydroxyether | 100% polyhydroxyether |
|---|---|---|---|---|
| Thickness, mils | 1.0 | 1.0 | 1.0 | 1.0 |
| Tensile Strength, p.s.i. (×10³), ASTM D 882–56 T | 9–10 | 7.5–8.5 | 8–9 | 10–12 |
| Percent Elongation, ASTM D 882–56T | 10–20 | 15–30 | 40–60 | 80–150 |
| Percent Haze, D–1003–52 | 1 | 3 | 3 | 3 |
| O₂ Permeability, D 1434–58, cc./mil/24 hrs./100 in.² | 400 | 40 | 20 | 5 |
| Percent Shrinkage at 130° C., D 1204–54 | 65 | 65 | 65 | 65 |

NOTE.—As in Example 1, unoriented films of the mixtures were brittle and opaque.

EXAMPLE 3

Two mixtures of different weight proportions of normally solid poly(methylmethacrylate) ($T_g=100°$ C.) with the same normally solid polyhydroxyether ($T_g=90°$ C.) as employed in Example 2 were blended, extruded and co-biaxially oriented using the same method as in Example 1. The physical properties of the composite films thus formed are compared with each other and with films of pure poly(methylmethacrylate) and pure polyhydroxyether in Table III below.

Table III

|  | 100% Polmethyl Methacrylate | 75% PMM, 25% PHE | 50% PMM, 50% PHE | 100% Polyhydroxyether |
|---|---|---|---|---|
| Thickness, mils | 1.0 | 1.0 | 1.0 | 1.0 |
| Tensile Strength p.s.i., both directions ASTM D 882–56T | 8,000–9,000 | 8,500–9,500 | 8,000–10,000 | 10,000–12,000 |
| Percent Elongation, both directions ASTM D 882–56T | 3 | 5–20 | 35–55 | 80–150 |
| Percent Haze D 1002–52 | 1 | 1 | 1.0 | 3.0 |
| Percent Shrinkage at 130° C., both directions ASTM D 1204–54 | 60–70 | 60–70 | 60–70 | 60–70 |
| Accelerated Weathering 200 hrs. exposure, WC 159–X1A | Good | Good | Fair | Poor |

NOTE.—As in Examples 1 and 2, the unoriented films were brittle and opaque.

EXAMPLE 4

To demonstrate the practice of this invention using more than two incompatible resin components, a three component mixture was formed by tumble blending equal weight proportions of pellets of polystyrene ($T_g=82°$ C.), poly(methylmethacrylate) ($T_g=100°$ C.) and Bisphenol-A-polyhydroxyether ($T_g=90°$ C., sample from Example 2). The pellets were cylindrical, having a length of about 1/8″ and a diameter of about 1/16″. The mixture was extruded as blown tubular film and was biaxially oriented according to the method of Example 1. Physical property data is set forth in Table IV below.

Table IV

| | |
|---|---|
| Thickness, mils | 1.0 |
| Tensile strength, p.s.i., both directions, ASTM D 882–56T | 8500–10,000 |
| Percent elongation, both directions, ASTM D 882–56T | 25–75 |
| Percent haze, ASTM D 1003–52 | 2 |
| Percent shrinkage at 130° C., both directions, ASTM D 1204–54 | 60–70 |

As in previous examples, unoriented film was brittle and opaque.

EXAMPLE 5

A mixture of equal parts by weight of polystyrene ($T_g=82°$ C.) and unplasticized vinyl chloride-vinyl acetate copolymer (10 weight percent vinyl acetate) ($T_g=80°$ C.) was mixed on a two-roll mill at 175° C. and pressed into 9″ x 9″ x .025″ sheets. The sheets were very brittle and opaque. The sheets were placed in a Formvac sheet tester and biaxially oriented using the conditions which stretched the sheet 5 fold in each direction at a temperature of 140° C. The center portion of the stretched sheet was now optically clear and very flexible.

EXAMPLES 6–11

Mixtures of the following incompatible resins in the indicated proportions were prepared, compression molded and biaxially oriented in the manner of Example 5:

(a)

| | Parts (wt.) |
|---|---|
| Bisphenol-A polyhydroxyether ($T_g=90°$ C.) | 50 |
| Vinyl chloride-vinyl acetate copolymer (unplasticized, 10% vinylacetate) ($T_g=80°$ C.) | 50 |

(b)

| | |
|---|---|
| Bisphenol-A-polyhydroxyether ($T_g=90°$ C.) | 50 |
| Styrene-acrylonitrile copolymer (28% acrylonitrile) ($T_g=90°$ C.) | 50 |

(c)

| | |
|---|---|
| Polystyrene ($T_g=82°$ C.) | 75 |
| Polyethylene terephthalate ($T_g=80°$ C.) | 25 |

(d)

| | |
|---|---|
| Polystyrene ($T_g=82°$ C.) | 50 |
| Polyethylene terephthalate ($T_g=80°$ C.) | 50 |

(e)

| | |
|---|---|
| Bisphenol-A polyhydroxyether ($T_g=90°$ C.) | 75 |
| Polyethylene terephthalate ($T_g=80°$ C.) | 25 |

(f)

| | |
|---|---|
| Bis-A polyhydroxyether ($T_g=90°$ C.) | 50 |
| Polyethylene terephthalate ($T_g=80°$ C.) | 50 |

In each instance the films were transparent and quite flexible. In those examples in which polyethylene terephthalate was employed, it was necessary to maintain the polymer, which is normally crystalline, in the amorphous condition by rapidly cooling the compression molded sheet prior to the biaxial orientation step.

EXAMPLES 12–15

Clear, high gloss, flexible one mil films were unexpectedly formed when forty to fifty mil translucent to opaque sheets, prepared from incompatible mixtures of crystal polystyrene with various rubbers were subjected to biaxial orientation, in the amorphous state above their second order transition temperature. The rubbers shown below, which are potential impact improving additives, were hot compounded into the crystal polystyrene in a Banbury mixer. The Banbury discharge was then milled into ⅛" sheet and cut into small square sections. These milled sections were pressed into forty to fifty mil by eight inch square plaques using a forty mil cavity mold. A Formvac sheet tester was used to draw these plaques into 1.0 mil bioriented film at a temperature of 220° F. and a draw distance of 5–5¼". The degree of orientation, as measured by shrinkage, varied from sample to sample but was generally greater than 300% in each instance. The Formac sheet tester is operated by placing the sample to be drawn in a clamping frame and heating the sample to a preset temperature by means of a radiant heater. When the preset temperature is reached the sample is automatically drawn over a silk covered mandrel. The thickness of the drawn film is determined by the draw distance and the thickness of the original sheet. After the drawn film is cooled the sample is manually removed from the sheet tester.

(a) Butyl Rubber GRI–17, 10%; Polystyrene, 90%.
(b) Plioflex 1006 (Rubber), 10%; Polystyrene, 90%.
(c) Firestone 181 (Rubber), 10%; Polystyrene, 90%.
(d) Phillips Philprene X–40 (Rubber), 5%; Polystyrene, 90%.

EXAMPLE 16

A sample of 50% polyhydroxyether-50% polystyrene film from Example 2 was placed in a water filled Waring blender and subjected to a violent beating operation for 10 minutes. The film was reduced to extremely fine wafer-like lamellae which were then recovered by filtration. These fine lamellae are suitable as fillers for moulding compositions of if they are colored or metallized, are suitable for decorative purposes.

EXAMPLE 17

A sample of 50% polystyrene-50% polymethyl methacrylate film from Example 1 was inscribed with a writing pen dipped in acetone solvent. The film which was clear because of the biaxial orientation then became opaque where the pen traced as the molecules contacted relaxed under the influence of the solvent. The inscription was easily legible with the unaided eye, and could be projected and enlarged on a viewing screen to produce a black on white image. As an alternative method, portions of the film were exposed to the heating action of an infra-red lamp, thereby creating local opacity in the heated area having the same properties as the acetone inscribed article.

In addition to the incompatible resins described hereinbefore, the films and sheets of the present invention can contain various conventional additives such as inert fillers, antioxidants, stabilizers, plasticizers, colorants, pigments and the like without departing from the proper scope of this invention.

Certain films formed from mixtures of incompatible synthetic resins in accordance with the present invention have also been found to possess unique barrier properties. Because of the lamellate configuration of the dispersed polymer phase, the use of resins having a high resistance to permeation by vapors and gas as the dispersed phase remarkably improves the impermeability of the composite film even though the major resin component per se is poor in barrier properties. Vinylidene chloride homopolymers and copolymers, i.e., the so-called Saran polymers, and polyhydroxyether (supra) are outstanding as the dispersed phase in such matrices as polyethylene, polystyrene and the well known poly(acrylic) resins. Amounts of high barrier property lamellae of as low as 2–5 weight percent up to about 40 weight percent are highly effective. Inert lamellae such as mica flakes can also be included.

What is claimed is:

1. As an article of manufacture, a transparent, biaxially oriented composite thermoplastic film composed of an intimate admixture of at least two mutually incompatible synthetic organic resins, each of said organic resins being normally in an amorphous rubbery state at a temperature above their second order transition temperature and being orientable at a common temperature, said composite film having a shrinkage value of at least about 5 percent along each of its major axes at a temperature 50° C. above the second order transition temperature of the polymer species present in said film in an amount at least as great as any other polymer species present in said film and said film having a thickness no greater than about 20 mils and a lamellate configuration of very thin, individual lamellae having a large surface area, which lamellae lie in substantially parallel planes with respect to each other and whose respective major planar surfaces are in intimate contact with each other throughout said composite film.

2. The composite thermoplastic film of claim 1 wherein one of said resins is present in an amount of from 5 to 95 weight percent based on the total weight of the two resins present in said film and, said composite film having a maximum shrinkage value of at least 20 percent in the direction of each major axis.

3. The composite film according to claim 2 in which the maximum shrinkage value in the direction of each major axis is at least about 50 percent.

4. The composite film according to claim 3 wherein one of the two mutually incompatible resins is present in an amount of from about 5 to about 50 weight percent based on the total weight of the two resins.

5. The composite thermoplastic film of claim 1 wherein one of said resins is present in an amount of from about 5 to about 50 weight percent based on the total weight of the two resins, and said film is biaxially oriented in the direction of each of its two major axes in an amount such that said film has a shrinkage value of at least 5 percent in the direction of each of its major axes.

6. The composite film of claim 5 wherein one of the two mutually incompatible resins is polystyrene.

7. The composite film of claim 5 wherein one of the two mutually incompatible resin is poly(methylmethacrylate).

8. The composite film of claim 5 wherein one of the two mutually incompatible resins is polyethylene terephthalate.

9. The composite film of claim 5 wherein one of the two mutually incompatible resins is a polymer of vinyl chloride.

10. The composite film of claim 9 wherein the polymer of vinyl chloride is a copolymer of vinyl chloride and vinyl acetate.

11. Process for preparing a film transparency bearing a substantially opaque image suitable for projection on a viewing screen which comprises selectively relaxing the molecular orientation within the desired image-forming areas of a substantially transparent composite thermoplastic film composed of a mixture of at least two mutually incompatible synthetic organic resins, each of said organic resins being normally in an amorphous rubbery state at a temperature above their second order transition temperature and being orientable at a common temperature, said composite film being biaxially oriented and having a shrinkage value of at least about 5 percent along each of the major axes at a temperature 50° C. above the second order transition temperature of the polymer species present in an amount at least as great as any other polymer species present.

12. Process according to claim 11 wherein the desired image-forming area of the biaxially oriented composite film is made substantially opaque by preferentially heating the said image-forming area to a temperature sufficient to permit oriented molecules within said area to relax, thereby causing localized shrinkage and the development of opacity.

13. Process according to claim 12 wherein the preferential heating of the image-forming area is accomplished by superimposing on said biaxialy oriented composite film an image-bearing sheet having the said image portions formed of a material capable of transmitting infra-red energy waves to a degree substantially different from the nonimage-bearing portions, and thereafter exposing the ply thus formed to infra-red waves for a period of time sufficient to selectively relax the oriented molecules within said biaxially oriented film which are in contact with those portions of the image-bearing sheet which absorb infra-red waves to the greater degree.

14. Process according to claim 11 wherein the desired image-forming area of the biaxially oriented composite film is made substantially opaque by applying to the desired image-forming area a plasticizer for at least one resin component of said biaxially oriented composite film in an amount sufficient to permit oriented molecules within said area to relax, thereby causing localized shrinkage and the development of opacity.

References Cited by the Applicant

UNITED STATES PATENTS

| | | | |
|---|---|---|---|
| 2,353,457 | 7/1944 | Goessling | 18—55 |
| 2,502,240 | 3/1950 | Wiley. | |
| 2,793,399 | 5/1957 | Gallay et al. | |
| 2,821,155 | 1/1958 | Seckel. | |

FOREIGN PATENTS 761,075  11/1956  Great Britain.

OTHER REFERENCES

Ser. No. 715,003, Wulff et al. (A.P.C.), published Apr. 27, 1943.

ALEXANDER H. BRODMERKEL, *Primary Examiner.*

MICHAEL V. BRINDISI, *Examiner.*